United States Patent [19]

Nadler

[11] Patent Number: 4,504,971
[45] Date of Patent: Mar. 12, 1985

[54] PROCESS AND DEVICE FOR THE AUTOMATIC SEGMENTATION OF A SCANNED IMAGE IN AN IMAGE PATTERN RECOGNITION SYSTEM

[76] Inventor: Morton Nadler, 17 Les Huppes, 78170 La Celle Saint Cloud, France

[21] Appl. No.: 370,360

[22] Filed: Apr. 21, 1982

[30] Foreign Application Priority Data

Apr. 25, 1981 [GB] United Kingdom ............. 8112809

[51] Int. Cl.³ ............................................. G06K 9/46
[52] U.S. Cl. .......................................... 382/26; 382/9
[58] Field of Search ............................ 382/6, 9, 25, 26; 377/11

[56] References Cited

U.S. PATENT DOCUMENTS

| | | | |
|---|---|---|---|
| 3,178,687 | 4/1965 | Perotto | 382/26 |
| 3,290,650 | 12/1966 | Bailey, Jr. et al. | 382/26 |
| 4,163,213 | 7/1979 | Nadler | 382/26 |
| 4,183,013 | 1/1980 | Agrawala et al. | 382/26 |

*Primary Examiner*—John C. Martin
*Assistant Examiner*—Michael D. Parker
*Attorney, Agent, or Firm*—Bucknam and Archer

[57] ABSTRACT

A pattern recognition system comprising scanning means (1) for producing a binary signal indicative of the state of the elementary areas in successively scanned columns of elementary areas and segmentation means to separate from said signal data relating to individual discrete graphic objects in the scanned pattern and to store the separated data in individual storage zones of a memory array, characterized in that said segmentation means comprise a QTC generator (2) for producing quasitopological codes indicative of predetermined states of successive elementary areas using the data in the signal of each successive scanned column and the data in the signal of the last previously scanned column, and for producing therefrom a start and a stop signals at the beginning and end of any series of data corresponding to a fragment of a graphic object, the succession of codes being different depending on whether a fragment detected in the signal is or is not continued from last previously scanned column, and assignment control means (3) for assigning a selected memory zone of a memory array (4) to any said series of data depending on the codes allotted at the beginning and end of the fragment, and controlling the delivery of said series of data to said selected memory zone.

14 Claims, 10 Drawing Figures

PROCESS AND DEVICE FOR THE AUTOMATIC SEGMENTATION OF A SCANNED IMAGE IN AN IMAGE PATTERN RECOGNITION SYSTEM

Automatic pattern recognition systems, based on the use of Quasi-Topological Codes (QTC) are well known (see, for example, British Pat. No. 1,587,613) or U.S. Pat. No. 4,163,213. However their use has hitherto been restricted to supplying features for the analysis of characters that have been isolated from their background by other means. In the use of such systems it has been tacitly assumed that all linked areas entering into a given analysis in view of recognition, for example, as detected in a certain rectangular scanning window, belong together, and that all inked areas belonging to a given graphic symbol will be found in that window. In actual facts, however, characters may appear on a background of extraneous information, such as fragments of other characters when a line of closely typed or printed text is being scanned, these fragments appearing in portions of the lines above and/or below the line intended to be scanned, and which cannot be excluded from the scanning window for reasons of mechanical or optical design. Furthermore, even if broken characters, due to inking defects, are not taken into consideration, many symbols exist consisting of several disconnected portions. These include such punctuation marks as the colon and semi-colon, accented letters in many languages, etc.

The usual isolation means to isolate each character from the background or neighbouring characters, is designed to detect the existence of an unlinked rectangle surrounding the character to be analysed. In its simplest versions it is assumed that no interfering matter is present above or below the character in the scanning window, and therefore only uninked columns immediately preceding and immediately following the character are required. This system fails, for example, when an underline appears in the scanning window. Furthermore, the scanning window cannot be sufficiently restricted when, for example, it may be expected that the scanned lines of text may be skewed. In such a case the window that scans across the line of text must be high enough that the characters composing that line not be truncated by the top or bottom of the scanning window at the extreme positions. Usually in such cases restrictions must be placed on the minimum spacing between successive lines of the text, so that portions of the lines above or below the line being scanned can not enter the scanning window.

In another application of automatic reading graphic objects of undefined dimensions are expected to be read, such as handwritten words or signatures. In such cases the usual procedure is to store the information data relating to the entire image or pattern in random access memory (RAM) and to carry out a search and analysis procedure on the data stored in RAM after storage is complete. But then, it is well known that many handwritten words, and especially signatures, may be written with interruptions, disconnected flourishes, etc.

It is the purpose of the present invention to supply segmentation means for automatically determining and isolating individual discrete graphic objects, graphic symbols or characters, without the need of their prior storage, in the course of their acquisition by an ordinary scanning head, well known in automatic reading technology, consisting of a simple linear array of photosensitive elements, scanning successive vertical or nearly vertical columns that in their ensemble cover the line of text to be read by, for example, displacement of the head horizontally over the document to be scanned at the position of the line of text or, equivalently, displacing the document horizontally under a fixed scanning head, for storing data related to said individual discrete graphic objects in preassigned individual storage zones, one zone for each such object, and for initiating analysis of the stored data relating to an individual discrete graphic object immediately after the scanning process has terminated acquisition of data relating to said object.

Among the advantages offered by the use of the present invention in an automatic reading system will be the possibility of simultaneous acquisition and analysis of a multiplicity of graphic objects, thereby increasing the effective reading rate of such a system, on the one hand, and making it more flexible, on the other. The fact of segmenting the text image into individual unconnected fragments will not interfere with the possibility of recognising compound symbols, consisting of several such fragments, e.g. accented letters, since the stored data will allow a recognition process to be executed that can determine the association between the individual fragments. Furthermore, multiple lines of text can be processed in a single scan if the window is high enough, etc. In particular, an apparatus constructed according to the invention will enable text with large values of skew in closely spaced text to be read without difficulty.

Essentially the system according to the invention functions by the analysis of the sequence of QTC detected during the scan over graphic objects of fragments, the assignment of a predetermined individual storage or memory zone to each new graphic object upon detection of the latter, as signalled by a particular QTC, the transfer to said memory zone of selected codes and information data relative to that graphic object, the analysis of the stored information data either simultaneously with its acquisition and storage or when the scan of the given graphic object has been completed, as signalled by a different particular QTC, for purposes of recognition, transformation, or other operation connected with the operation of automatic reading equipment.

The invention will now be explained by means of the accompanying diagrams.

Figure 1:
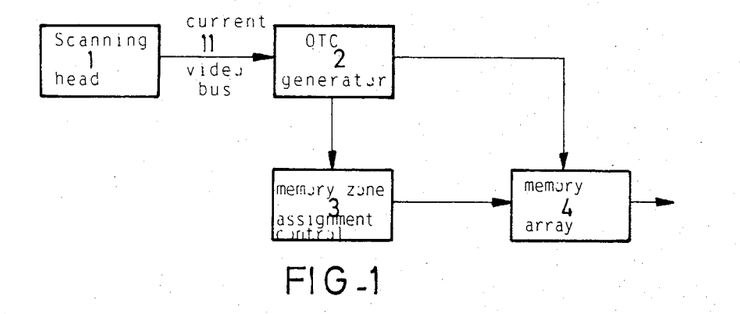
FIG. 1 represents the general block diagram of an apparatus according to the invention.

In FIG. 1 the following circuit modules are represented: 1—the scanning head; 2—the QTC generator; 3—the memory zone assignment control; 4—the memory array. The output from the scanning head to the QTC generator is via the video bus 11, and the output from the memory array of completed graphic objects symbols or certain codes representing them is via the output bus 43.

Figures 2, 3:
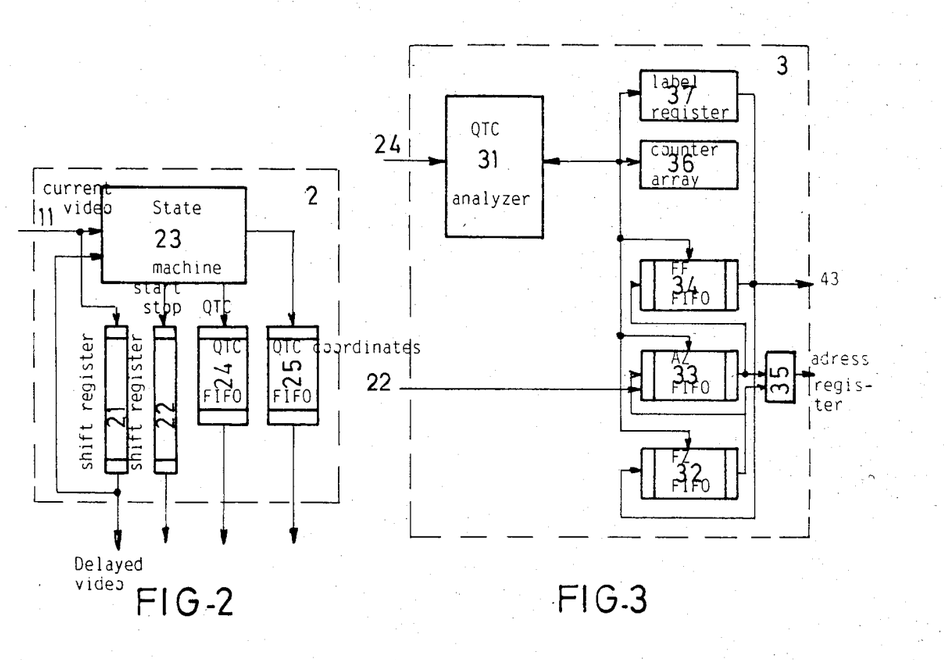
FIGS. 2–4 represent certain details of the circuit modules comprised in the system. The set of QTC used by the system to effect the operations according to the invention are represented in FIG. 5.

The QTC generator 2 is shown expanded in FIG. 2. The QTC are generated by the state machine 23, using the incoming video on bus 11 and the recirculated video from the previous column via the one-column delay line 21; the outputs of the state machine 23 are the QTC, which are pushed into a first-in-first-out (FIFO) delay line 24, the coordinates of the area where the QTC have been detected, in terms of the row and column of the scan, via a second FIFO 25, and video start/stop signals over a one-column delay line 22.

The memory zone assignment control is represented in greater detail in FIG. 3: the QTC are received from the QTC FIFO 24 by a mechanism to be described below as the QTC analyser 31 and the start/stop signals from delay line 22 at the active zone FIFO (AZ FIFO) 33; when required, idle or free memory zones can be assigned by being fetched from the free zone FIFO (FZ FIFO) 32; active memory zones in the process of storing information are identified by the memory zone address register (MZA) 35; certain information required by the control system is stored in the fragment counter array (FC) 36 and the slave zone label register array 37.

The QTC analyser 31 detects row and column coordinates of the elementary area when a QTC code has been determined and registers the coordinates in the selected memory zone.

Figure 4:
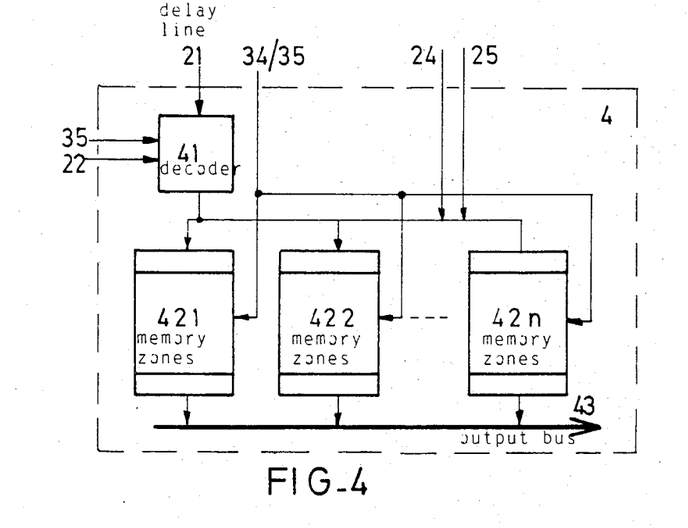

Details of the memory array are indicated in FIG. 4: video to be stored in a given memory zone arrives serially from the one-column delay line 21, and is steered to the required memory zone by an n-way decoder 41, under control of the memory zone identifier obtained from MZA 35; QTC and QTC coordinates can be stored directly in the memory zone under command from the same MZA; it is assumed that there are n distinct memory zones 421, 422, . . . , 42n; output of information from a given memory zone can be commanded by the FF FIFO 34 over the output bus 43.

Figure 5:
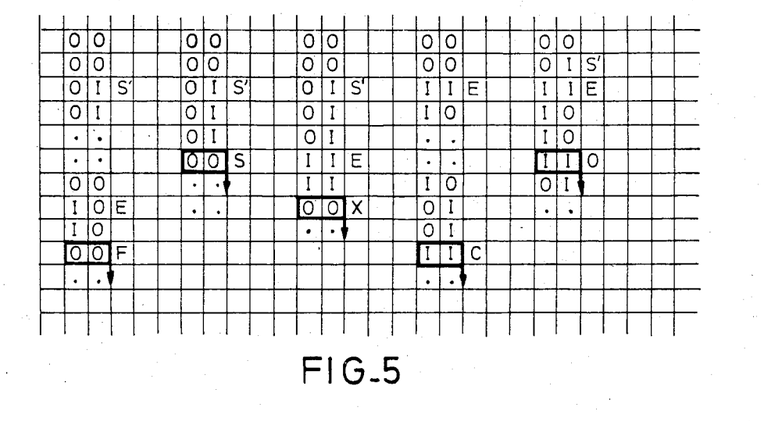

In the usual manner the scanning head 1 supplies a binary signal representing elementary inked areas of the scanned document, for example, by the value 1, and the unlinked areas by the value 0. As described in the literature (cf. the scientific communication by Morton Nadler entitled "Sequentially Local Picture Operators", published in the Proceedings of the Second International Joint Pattern Recognition Conference, Copenhagen, 1974, the contents of which are incorporated herein by reference), QTC can be obtained from a systematic scan over graphic symbols by means of a state machine whose inputs are obtained from a mobile window that follows the scan. For example, to obtain the QTC shown in FIG. 5 the window would consist of two picture elements, taken in two consecutive columns, and in the same row, while scanning down the two columns in synchronism. This can be obtained, as will be evident to the expert, by means of a one-column shift register 21, whose input is the current video obtained from the scanning head, and whose output is the delayed video that was received one column earlier. The QTC represented in FIG. 5 are defined as follows:

S'—hypothesis of possible detection of new fragment (stroke);

S—detection of new fragment;

F—finish, i.e., detection of end of fragment;

O—opening of loop, i.e., separating of a previously detected fragment into two separate strokes with respect to the vertical scan;

C—closing together of two previously separated strokes;

E—entrance of the scanning window into an already previously acquired fragment;

X—exit of the scanning window from a fragment other than one just acquired (as recognised by the QTC S).

The QTC as represented in FIG. 5 are presented graphically as for a scanning head that moves over the document from left to right. For the code C two distinct cases are considered: where the two strokes that join together have been originally detected by separate and independent starts S, which shall be called here "external close", and where the two strokes that join together originally arose by the opening of a loop O, called here "internal closing".

The state machine to generate these QTC is defined, in the usual way, by the following table.

|   | 00 |   | 01 |   | 10 |   | 11 |   |
|---|----|---|----|---|----|---|----|---|
| 0 | 0  |     | 1 | [S'] | 2 | [E] | 3 | [E] |
| 1 | 0  | [S] | 1 |      | 4 | [E] | 3 | [E] |
| 2 | 0  | [F] | 5 |      | 2 |     | 3 |     |
| 3 | 0  | [X] | 5 |      | 4 |     | 3 |     |
| 4 | 0  | [X] | 5 | [O]  | 4 |     | 3 | [O] |
| 5 | 0  | [X] | 5 |      | 4 | [C] | 3 | [C] |

Here the leftmost column gives the ordinal number of the state defined in that row, starting from state 0, and the remaining columns define the next states for each possible combination of the two input bits and the output QTC, if any. The columns are headed by the corresponding bit combinations, the delayed video bit represented at the left of each pair and the current video bit represented at the right, corresponding to their positions as detected by the scanning head, with 0 standing for unlinked areas and 1 for inked areas. The output QTC are represented by their codes, as defined above, in square brackets. The technology of state machines, with their tables set up in read-only store (ROM) is too well known to require further explanation here.

The QTC generator 23 can produce an S' code when an elementary area shows an inked state after a preceding one in an unlinked state and the corresponding elementary area in the previously scanned column was in the uninked state, and an S code when a later elementary area in the column shows the uninked state.

The QTC generator 23 also can produce an E code when after an S or S' code an elementary area showing the inked state was found after a preceding elementary area in the uninked state in the previously scanned column.

The QTC generator 23 also can produce, after an E code, when a later elementary area in the previously scanned column shows the uninked state, either an F code if the elementary area in the newly scanned column is in the uninked state as well as the preceding elementary area in the column, or an X code if not.

The QTC generator 23 also can produce, after an E code, first an O code when an inked area following an uninked area in the newly scanned column indicates an opening of a loop, then a C code when an inked area following an uninked area in the previously scanned column indicates closing of said loop.

The QTC generator can also produce start signals for QTC S' codes and QTC E codes that do not follow an S' code, and stop signals for QTC S, X and F codes.

The QTC generator can also produce after an E code first an O code when an inked area following an uninked area in the newly scanned column indicates an opening of a loop, then a C code when an inked area following an uninked area in the previously scanned column indicates closing of said loop and said assignment control means further comprise means to increment said number when an O code is received and to decrement it when a following C code is received, and means to detect external closings occuring when a C code is received not following an O code and to store the corresponding data in a slave memory zone ascribed to the same graphic object as said selected memory zone.

The video input at the start of every scanning column is made to take on the value 0 for at least one clock time, to ensure that the state machine starts the column in the state 0.

In a complete system QTC along other scan directions may be required, as described in the cited article and will be pushed into the QTC FIFO 24 in their order of detection, but only the above QTC, detected in the vertical direction, and called vertical QTC (VQTC) are used for control purposes in the memory zone assignment control module according to the present invention. In the explanation of function according to the invention that follows it is assumed that only the VQTC are taken into account by the memory zone assignment control module 3; the other QTC will be stored in their assigned memory zones by the mechanism described here using the VQTC exclusively.

In addition to the QTC pushed into the QTC FIFO 24 and the row and column coordinates at which they have been detected, pushed into the QTC-coordinate FIFO 25, the QTC generator module 2 will generate start/stop signals which circulates in the one-column delay shift register 22 synchronously with the delayed video bits in the shift register 21. Start pulses are injected into the shift register 22 for VQTC S' and for those E that do not follow S'; stop pulses will be injected for VQTC S, X, F. The effect of these signals will be to inform the memory zone assignment control 3 of the times when strings of bits corresponding to individual fragments (strokes) of graphic symbols start and stop emerging from the video shift register 21, thereby enabling them to be steered to the appropriate memory zones by the n-way decoder 41.

Finally, at the end of every column, during the time that the input to the QTC generator 23 is forced to be identically zero, as noted above, zero code is pushed into the QTC FIFO 24 to signify end of column (EOC), to separate the QTC sequences belonging to successive columns.

It is to be noted that the code S', which has been utilised to generate a start pulse in shift register 22, is not otherwise required by the memory zone assignment control, and so is not pushed into the QTC FIFO 24. Thereby the first code in a given column must be either S, for a newly detected fragment, or E, for a previously acquired fragment.

Operation of the system is initiated by loading the FZ FIFO 32 with the identifiers (addresses) of the entire set of available memory zones, which are initially unoccupied, for example, by the use of a counter module not shown here, pulsed n times, and its state at each pulse being pushed into the FZ FIFO, thereby loading it with the numbers from 1 to n; this can be obtained by the use of a fixed-program microprocessor or by a circuit using standard logic modules as will be evident to the logic design expert. During this initialisation the output of the scanning head is neutralised, in order not to produce erroneous results. After the initialisation of the system is completed, the further operation takes place according to the flowcharts FIGS. 6–10.

Figure 6:
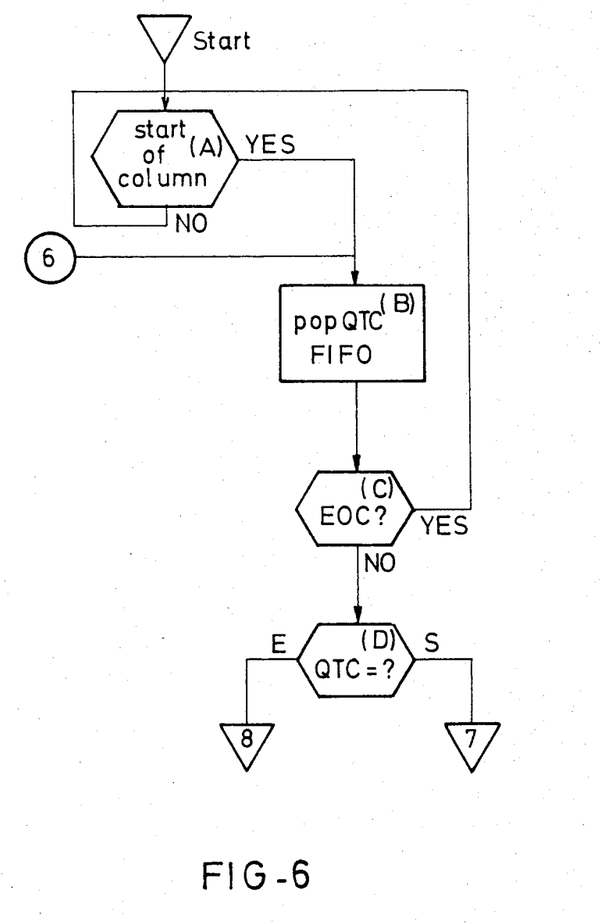
FIGS. 6–10 respresent certain sequences of operations taking place in an apparatus according to the invention.

Referring to FIG. 6, the initial operation is to wait for the start-of-column signal (A), which is obtained from the general system control clock, not the subject of this invention, but which is required for the general operation of automatic reading systems using a column scan. When this signal is received the control circuit pops the QTC FIFO (B). The code obtained will be necessarily one of three: either the EOC stored at the end of the preceding column (C) or QTC S or E (D). If EOC, this means that no graphic symbol is currently being scanned, and the system returns to the state of waiting for the next start of column. Otherwise the further operation will take place as indicated in FIG. 7 (for QTC S) or FIG. 8 (QTC E).

Figure 7:
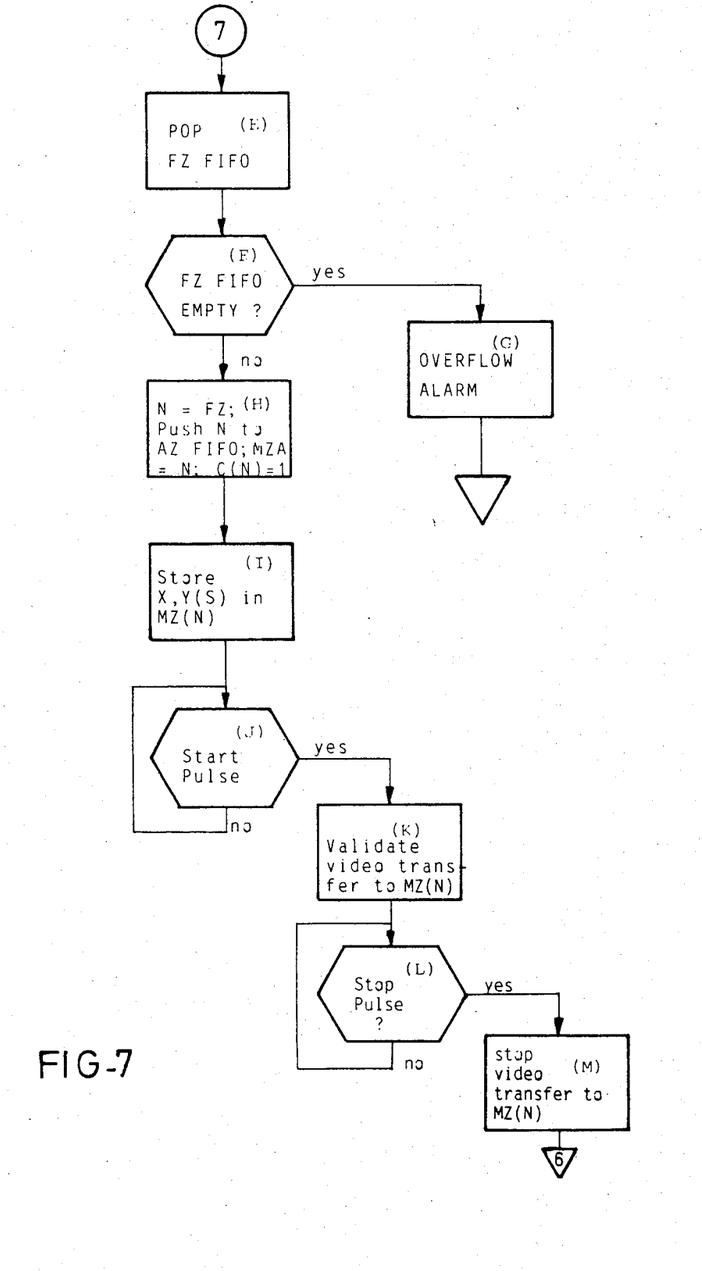

Referring now to FIG. 7, we find the sequence of operations to be effected for QTC S. This QTC indicates that the start of a new graphic object has been detected in the preceding column. The video signals associated with this object will be found at the time the QTC S is popped from QTC FIFO 24 in the one-column delay shift register 21, and the start and stop pulses for this video-bit string are in the shift register 22. It is necessary to assign a free memory zone to the storage of these video bits and to effect their storage and the storage of the QTC S with its coordinates in the assigned zone. To this end FZ FIFO 32 is popped (E). If the system has been overloaded previously by, for example, scanning of a soiled spotty document or by an excessive number of disconnected graphic symbol fragments simultaneously present in the scanning window there may be no free memory zones available at this operation. The signal FIFO empty (F) will cause the system to go into an alarm mode, to indicate to the user that the data are not valid and operation will terminate (G). If normal operation continues, with availability of a new free zone N,N is pushed into AZ FIFO 33 and placed in the MZA 35, and the associated counter C(N) is set to the count 1, to indicate that in the next column one fragment (strokes) of the given graphic object is expected (H). The OTC S and its coordinates, popped from FIFO 25, are stored in memory zone N under command of the address selection in MZA 35 (I). When the start signal is detected at the output of the delay register 22 (J) video transfer to memory zone N is validated (K) until the stop signal is received (L), whereupon the transfer is stopped (M). Control is returned to the sequence of FIG. 6 at the point 6.

Figure 8:
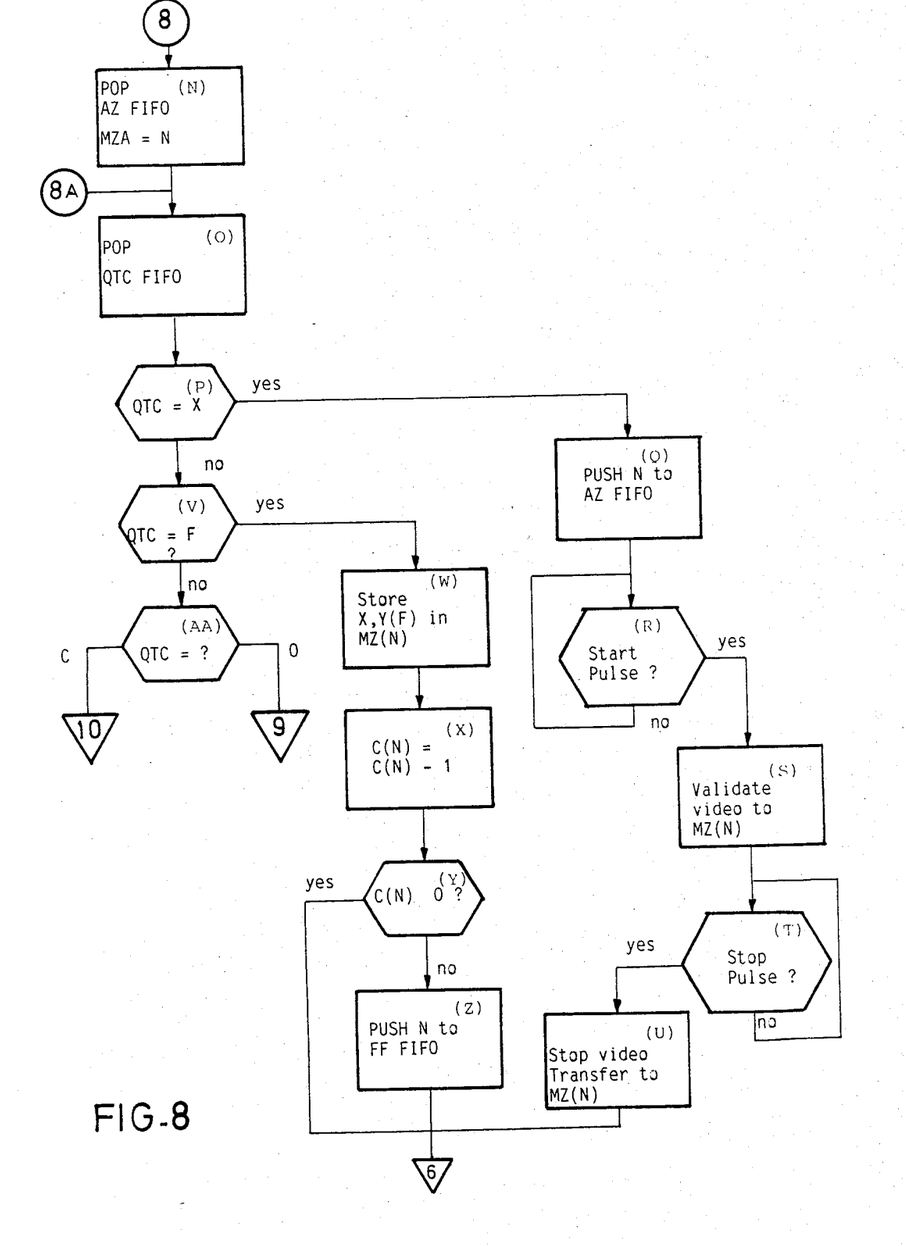

Referring now to FIG. 8, we find the sequence of operators to be effected if the QTC fetched at (D) was the QTC E. Since the QTC E signifies that the next fragment is one that has been acquired earlier, and by construction its memory zone identifier is at the top of AZ FIFO 33, AZ FIFO is popped and the identifier N is placed in MZA 35 (N). To determine the nature of the fragment and the operations to be performed, QTC FIFO 24 is again popped (O); if QTC X is fetched (P), the scan has passed over a simple stroke and the same action will be repeated in the following column. Therefore N is pushed into AZ FIFO and the video bits are steered to memory zone N as before (R-U). If the QTC F is fetched (V), it and its coordinates are stored in the memory zone N (W), the counter C (N) is decremented (X) and tested for equality to 0 (Y). If C (N)≠0, this means that not all strokes of the symbol have terminated, for example, in the letter "E", where three strokes must terminate in a left-to-right scan before the scan of the symbol is completed, and in this case control is returned to 6. If C (N)=0, this indicates that the QTC F is final (FF), and the memory zone identifier N is pushed to FF FIFO 34 (Z), preparatory to the final analysis of the contents of memory zone N, and control is returned to 6. Finally, if QTC was not F, then it must be O or C (AA). If it is QTC O control is passed to 9, if QTC C then to 10.

Figure 9:
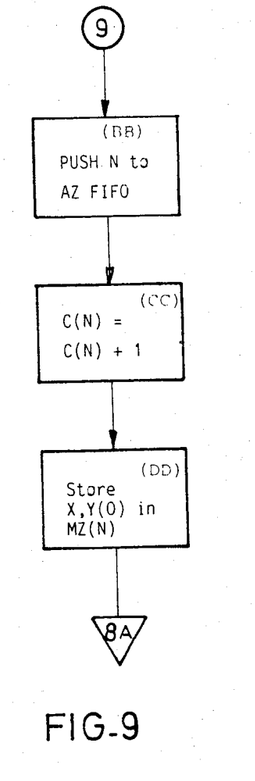

The operations for QTC O are very simple. Referring to FIG. 9, we see that a copy of N is pushed into AZ FIFO 33, setting up the conditions for two scans over portions (strokes) of the symbol or object being scanned in the next column, due to the opening of the fragment detected by QTC O (BB). The counter C (N) is incremented (CC), the QTC O and its coordinates are stored (DD) and control is returned to 8A since the analysis of the given fragment has not been completed.

Figure 10:
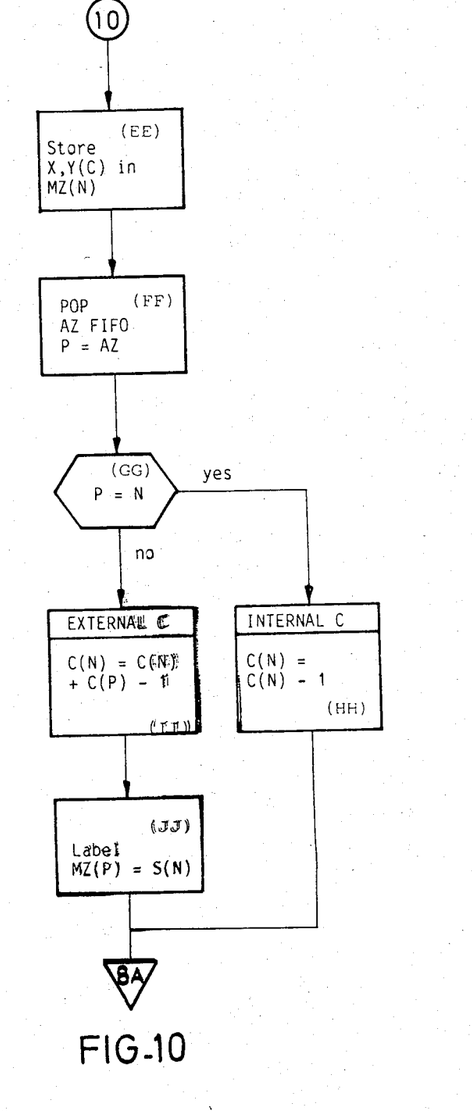

Referring now to FIG. 10, we find the operations to be effected for QTC C. It has already been noted that there are two classes of closings: internal and external. The internal closings must occur in closed loops, for example in "0" or "8", since it is only by an opening (QTC O) that more than one fragment can exist with the same memory zone assignment, as has been shown in the discussion of QTC O and FIG. 9. The QTC C and its coordinates are stored in memory zone N (EE), and the AZ FIFO 33 is popped (FF). The memory zone indentifier that is fetched P is compared to the contents of MZA 35 N (GG). If they are equal, then the closing is "internal", the counter C (N) is decremented (HH) and control is returned to 8A. If they are not equal, the closing is "external". The contents of counter C (P) are added to the contents of counter C (N) and the sum decreased by 1 (II), to indicate the correct number of fragments to be encountered in the next column. Finally memory zone P is labelled "slave" in the register array 37 of slave zone labels (JJ). No further data will be stored in memory zone P, but the data already stored in it are now ascribed to the graphic object being analysed in memory zone N, and at the final F of memory zone N the data of both N and P must be fetched, as will be explained next. Control is returned now to 8A.

When final F has been stored in a memory zone, the complete information stored therein is ready to be analysed. The data are output from the memory zone via the output bus 43. When the output bus 43 is free, i.e., no memory zone is outputting data over it, FF FIFO 34 is popped and the corresponding memory zone is commanded to output its data. At the same time the slave zone label array register 37 associated to memory zone N is examined to determine if there are any memory zones associated to it by virtue of an external closing. These data are of two kinds: QTC and their coordinates, and strings of video bits. It will be observed that in the absence of any particular transformations on the data, they are in fact some what redundant, one expressing the other. In the above description the codes S', E, and X, and their coordinates, were not described as being stored in the memory zone assigned to the graphic symbol to which these codes belong. In fact, if these codes and their coordinates are also stored, then complete redundancy with the video image will hold.

Modifications of the present design will be obvious to the expert to augment or diminish the stored information for purposes of recognition or transformation in the equipment using this segmentation system, and the concrete implementation described above has been given for purposes of explanation and illustration. In particular, logical devices can be associated to each memory zone to effect the analysis and transformation of the stored data during the time of scanning. While the present invention makes such association and such processing feasible, it is not the object of the present invention.

The final operation after the data stored in a given memory zone has been output under command of the memory zone identifier popped from FF FIFO 34 is to push the identifier back into FZ FIFFO 32, making the memory zone available again for further graphic objects. This also applies in an obvious way to slave memory zones.

In FIGS. 6–10 it will be noted that the operations taking place in the memory zone assignment control are defined in the form of flowcharts, for clarity. It is obvious to the expert how to construct the equipment for performing the operation described by means of standard integrated circuit modules. Fixed-program microprocessors can also be used for that purpose, with the program in read-only memory (ROM) for purposes of compactness or economy, where the speed of the latter is adequate.

I claim:

1. A pattern recognition system comprising scanning means (1) for producing a binary signal indicative of the state of the elementary areas in successively scanned columns of elementary areas and segmentation means to separate from said signal data relating to individual discrete graphic objects in a scanned pattern and to store the separated data in individual storage zones of a memory array, wherein said segmentation means comprises a QTC generator (2) for producing quasitopological codes indicative of predetermined inked and uninked states of successive elementary areas using the data in the signal of each successive scanned column and the data in the signal of the last previously scanned column, and for produced a start and a stop signal at the beginning and end of all series of data corresponding to inked fragments made of adjacent inked areas in a graphic object, successive codes given in a column being different depending on whether an inked fragment detected in the signal is or is not continued from last previously scanned column, and assignment control means (3) for assigning any said series of data to a selected memory zone of memory array (4) depending on codes alloted at the beginning and end of the fragment, and controlling the delivery of said series of data to said selected memory zone.

2. A pattern recognition system according to claim 1, wherein said segmentation means further comprise means to detect row and column coordinates of the elementary area when an QTC code was determined and to register said coordinates in said selected memory zone.

3. A pattern recognition system according to claim 1, wherein said QTC generator comprises means to produce an S' code when an elementary area shows an inked state after a preceding one in an uninked state and the corresponding elementary area in the previously scanned column was in the uninked state, and an S code when a later scanned elementary area in the column shows the uninked state.

4. A pattern recognition system according to claim 3, wherein said QTC generator comprises means to produce an E code when after a S or S' code an elementary area showing the inked state was found after a preceded elementary area in the uninked state in the previously scanned column.

5. A pattern recognition system according to claim 4 wherein said QTC generator comprises means for producing after an E code, when a later scanned elementary area in the previously scanned column shows the uninked state, either an F code if the elementary area in the newly scanned column is in the uninked state as well as the preceding elementary area in the column, or an X code if said elementary in said newly scanned column is not in the uninked state as well as the preceding elementary area in said newly scanned column.

6. A pattern recognition system according to claim 5, wherein said QTC generator further comprises means to produce after an E code first a O code when an inked area following an uninked area in the newly scanned column indicates an opening of a loop, then a C code when an inked area following an uninked area in the previously scanned column indicates closing of said loop.

7. A pattern recognition system according to claim 5, wherein said QTC generator comprises means to produce start signals for QTC S' codes and OTC E codes that do not follow an S' code, and stop signals for QTC S, X and F codes.

8. A pattern recognition system according to claim 7, wherein said assignment control means comprise means to select an free memory zone when a QTC S' code is received, means to maintain the same selection if after an E code a X code is received, and means to indicate end of that selection when a corresponding F code is received.

9. A pattern recognition system according to claim 8, wherein said assignment control means further comprises means to control the number of fragments to be stored in a same memory zone for a given object by incrementing said number when an S' code indicates the beginning of a fragment and decrementing said number when a F code indicates the end of a fragment.

10. A pattern recognition system according to claim 9, wherein said QTC generator further comprises means to produce after a E code first a O code when an inked area following an uninked area in the newly scanned column indicates an opening of a loop, then a C code when an inked area following an uninked area in the previously scanned column indicates closing of said loop and said assignment control means further comprise means to increment said number when an O code is received and to decrement it when a following C code is received, and means to detect external closings occuring when a C code is received not following an O code and to store the corresponding data in a slave memory zone ascribed to the same graphic object as said selected memory zone.

11. An automatic segmentation device for a pattern recognition system comprising scanning means (1) for producing a binary signal indicative of the state of the elementary areas in successively scanned columns of elementary areas said segmentation device comprising a QTC generator (2) for producing quasitopological codes indicative of predetermined inked and uninked states of successive elementary areas using the data in the signal of each successive scanned column and the data in the signal of the last previously scanned column, and for producing a start signal and a stop signal at the beginning and end of all series of data corresponding to which fragments made of adjacent inked areas in a graphic object, successive codes given in a column being different depending on whether an inked fragment detected in the signal is or is not continued from last previously scanned column, and assignment control means (3) for assigning any said series of data to a selected memory zone of a memory array (4) depending on codes allotted at the beginning and end of the fragment, and controlling the delivery of said series of data to said selected memory zone.

12. A segmentation device for analysing a binary signal from a pattern recognition system said signal containing data indicative of alternate inked and uninked states of elementary areas in successively scanned columns of rows of elementary areas of said pattern, said segmentation device comprising a QTC generator for producing QTC codes upon changes in successives bit combination comprising said data relating to two successive elementary areas in a newly scanned column and to successive corresponding areas in corresponding rows of a previously scanned column, different codes being produced after inked areas in said newly scanned column (NSC) depending on whether they belong to a fragment of adjacent inked areas which is or is not contined from the previously scanned column (PSC), a plurality of memory zones for storing data or code and position information relating to said areas and assignment means controlled by said different codes to assign said information to a different selected memory zone any time said fragment is not continued from the PSC and to the same selected memory zone when it is continued.

13. A segmentation device according to claim 12 wherein said QTC generator comprises means to produce an S'code when an inked area follows an uninked area in the NSC while the corresponding areas in the PSC shows the uninked state, means to produce an E code when uninked area was found after an uninked area in the PSC, means to produce either an S or an X code when an uninked area follows an inked area in the NSC and the corresponding area in the PSC was an uninked area, said code being an S code or an X code depending on whether the preceding code on the NSC was an S' code on an E code, and means to produce an F code when the areas in the NSC are uninked areas following and E code while in the PSC an uninked area follows uninked area, and wherein said assignment means operate upon said S and F codes to start and stop assigning said information to one selected memory zone.

14. A segmentation device according to claim 13 further comprising means to produce segment start pulses indicating the beginning of an inked fragment on a column upon all S' codes and upon any E codes not following an S' code and to produce stop pulses indicating the end of said fragment upon S codes, X codes, and F codes.

* * * * *